United States Patent
McGlynn et al.

[11] Patent Number: 5,851,479
[45] Date of Patent: Dec. 22, 1998

[54] METHOD AND APPARATUS FOR BLOW MOLDING HOLLOW ARTICLES

[75] Inventors: Daniel F. McGlynn, Perrysburg; Robert A. Gillis, Toledo, both of Ohio

[73] Assignee: Owens-Brockway Plastic Products Inc., Toledo, Ohio

[21] Appl. No.: 773,454

[22] Filed: Dec. 24, 1996

[51] Int. Cl.⁶ .................................................. B29C 49/60
[52] U.S. Cl. ........................................... 264/526; 425/536
[58] Field of Search ................................... 264/504, 526, 264/540, 524; 425/536

[56] References Cited

U.S. PATENT DOCUMENTS

| | | | |
|---|---|---|---|
| 2,810,160 | 10/1957 | Bottleman | 425/536 |
| 3,342,916 | 9/1967 | Peters | 264/526 |
| 3,450,805 | 6/1969 | Chesser | 264/526 |
| 3,452,125 | 6/1969 | Schurman et al. | 264/526 |
| 3,492,106 | 1/1970 | Peters et al. | 264/540 |
| 3,550,197 | 12/1970 | Szajna et al. | 425/536 |
| 3,592,886 | 7/1971 | Havely | 264/526 |
| 3,636,151 | 1/1972 | Nagai | 264/526 |
| 3,737,275 | 6/1973 | Kontz . | |
| 3,873,661 | 3/1975 | Kontz . | |
| 3,973,896 | 8/1976 | Peters . | |
| 4,025,276 | 5/1977 | Peters | 425/536 |
| 4,087,503 | 5/1978 | Peters | 264/526 |
| 4,401,423 | 8/1983 | Bellehache et al. . | |
| 4,423,000 | 12/1983 | Teraoka | 264/524 |
| 4,523,904 | 6/1985 | Martin . | |
| 4,549,865 | 10/1985 | Myers . | |
| 4,648,831 | 3/1987 | Johnson . | |
| 4,882,978 | 11/1989 | Bruggeman et al. . | |
| 4,946,366 | 8/1990 | Dundas et al. . | |
| 4,954,310 | 9/1990 | Andersen . | |
| 5,229,043 | 7/1993 | Lee . | |

FOREIGN PATENT DOCUMENTS

| | | | |
|---|---|---|---|
| 1475911 | 4/1967 | France | 425/536 |
| 6231824 | 6/1989 | Japan . | |
| 2085797 | 5/1982 | United Kingdom . | |
| WO9007414 | 7/1990 | WIPO . | |

OTHER PUBLICATIONS

Rosato, *Blow Molding Handbook, Passage*, (1989) pp. 282–289.

*Primary Examiner*—Catherine Timm

[57] ABSTRACT

A method and apparatus for blow molding plastic articles which utilizes one or more fixed needles and one or more micro vents associated with a blow mold cavity. Each needle has a first passage associated therewith through which vacuum is supplied to pull the molten plastic about the needle and a second passage therein through which air under pressure is introduced to tear the plastic and blow the article to the confines of the mold which has been closed about the plastic parison. Micro vents facilitate exhausting air which is about the parison. Preferably the second passage for compressed air is provided by a central bore and the first passage for the vacuum is provided by an annular space about the fixed needle. In a modified form, the fixed needle comprises dual air passages. Provision is made for utilizing plural molds with controls for supplying air and vacuum.

21 Claims, 13 Drawing Sheets

METHOD AND APPARATUS FOR BLOW MOLDING HOLLOW ARTICLES

This invention relates to blow molding plastic articles such as hollow plastic containers.

BACKGROUND AND SUMMARY OF THE INVENTION

In the making of blow molded plastic articles utilizing blow molding machines, a hollow plastic parison of molten plastic material in the form of a tube is extruded between two complementary blow mold halves, the blow mold halves are closed and the tube is blown to the confines of the mold by utilizing a needle that pierces the tube and air is introduced into the interior of the tube through the needle to form the article such as a hollow container. One commercially successful arrangement is of the type shown in U.S. Pat. No. 3,737,275 and 3,873,661 wherein a movable needle is first advanced by air pressure to penetrate the extruded plastic tube and air is thereafter applied through a bore in the needle to inflate the tube. After blowing, the blowing air is exhausted and the blow needle is withdrawn. Such an arrangement not only uses multiple parts but also requires critical timing to provide for the movement of the movable needle.

Among the objectives of the present invention are to provide a method and apparatus wherein does not require a movable needle; which has no moving parts; which is simpler to construct and maintain; which is less costly; which reduces mold costs by utilizing simplicity of placement, design and manufacture; which has less downtime; which is more reliable; which is more readily maintained; and which facilitates process start up.

In accordance with the invention, the method and apparatus utilizes one or more fixed needles and one or more micro vents associated with the blow mold cavity. Each needle has a first passage associated therewith through which vacuum is supplied to pull the molten plastic about the needle and a second passage therein through which air under pressure is introduced to tear the plastic and blow the container to the confines of the mold which has been closed about the plastic parison. Micro vents facilitate exhausting air which is about the parison. Preferably the second passage for compressed air is provided by a central bore and the first passage for the vacuum is provided by an annular space about the fixed needle. In a modified form, the fixed needle comprises dual air passages. Provision is made for utilizing plural molds with controls for supplying air and vacuum.

DETAILED DESCRIPTION OF THE PREFERRED EMBODIMENTS

Figure 1:
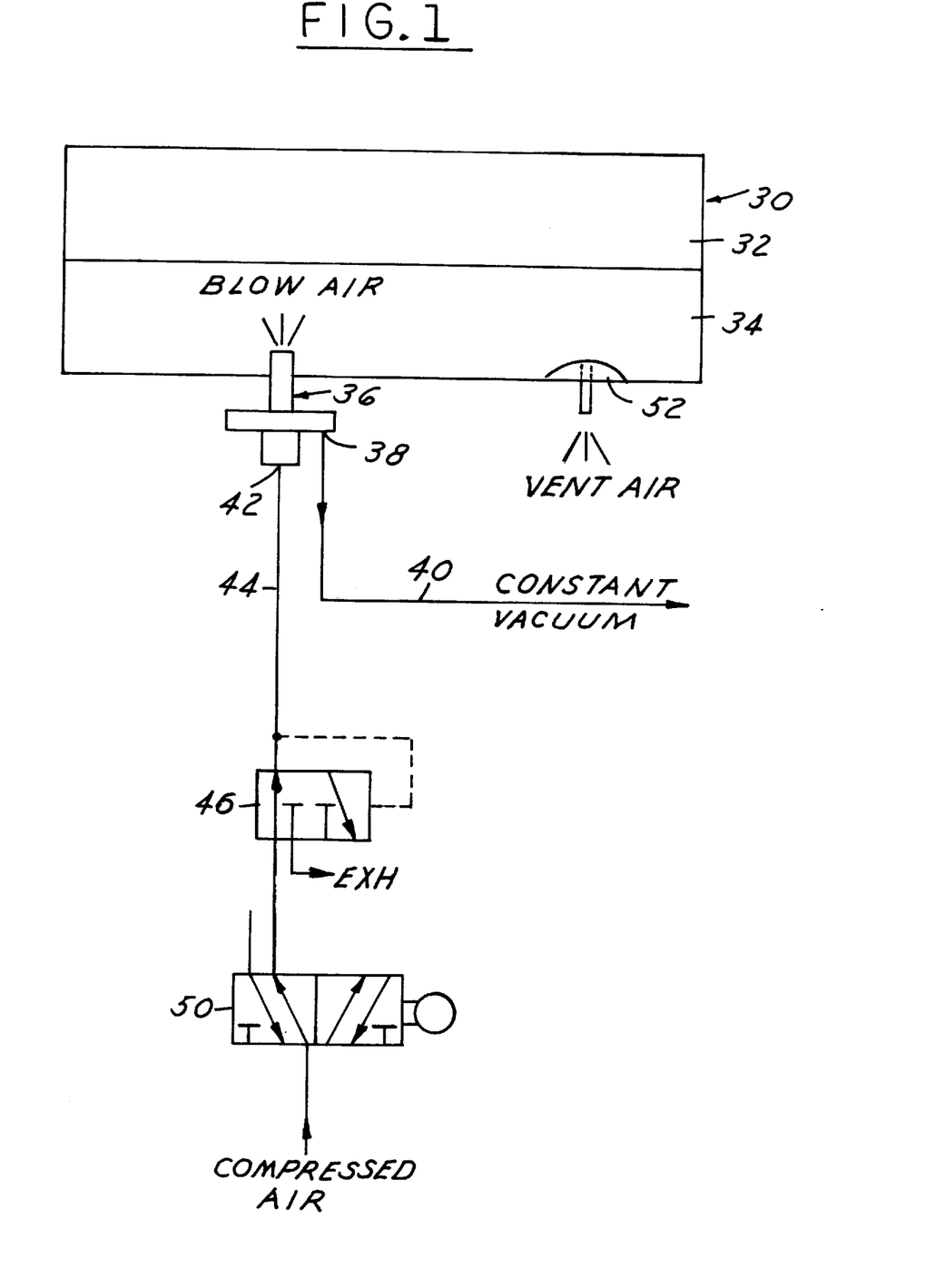
FIG. 1 is a schematic of one embodiment in accordance with the invention.

Referring to FIG. 1 which a schematic of one embodiment of the invention, the method comprises a blow mold 30 which comprises two mold halves 32, 34 which are closed about a plastic parison. A fixed blow needle 36 is provided in at least one mold half 34 and has an inner end extending in to the cavity of the mold 30. The needle 36 includes a first passage 38 surrounding the needle 36 which is connected to a source of vacuum through a line 40. Passage 38 extends to the interior of the mold 30. An exhaust valve 46 functions to exhaust the air in the second passage 42. The needle 36 includes a second passage 42 which is connected to a source of compressed air through a line 44. Passage 42 extends through the fixed needle 36 to the interior of the mold 30. A valve 50 is operable to control the flow of air through line 44. In addition, one or more micro vents 52 are provided in communication with the mold cavity to facilitate venting of the cavity.

The method is preferably provided for use with rotary blow molding machines such as shown in U.S. Pat. Nos. 4,523,904; 4,549,865; and 4,648,831, incorporated herein by reference.

In operation, a plastic parison of molten plastic in the form of a tube is extruded between the mold halves, the mold halves 32, 34 are closed and vacuum is provided through the first passage 38 to pull the plastic about the fixed needle 36. After a short time, for example, on the order of 0.5 second, compressed air is supplied through the second passage 42 to tear the plastic which has been stressed about the fixed needle 36 and the compressed air inflates the parison to the confines of the mold. After the shape of the article such as a plastic container has been set, the compressed air is turned off and another cycle can begin. A typical time cycle comprises 6 seconds.

Figure 2:
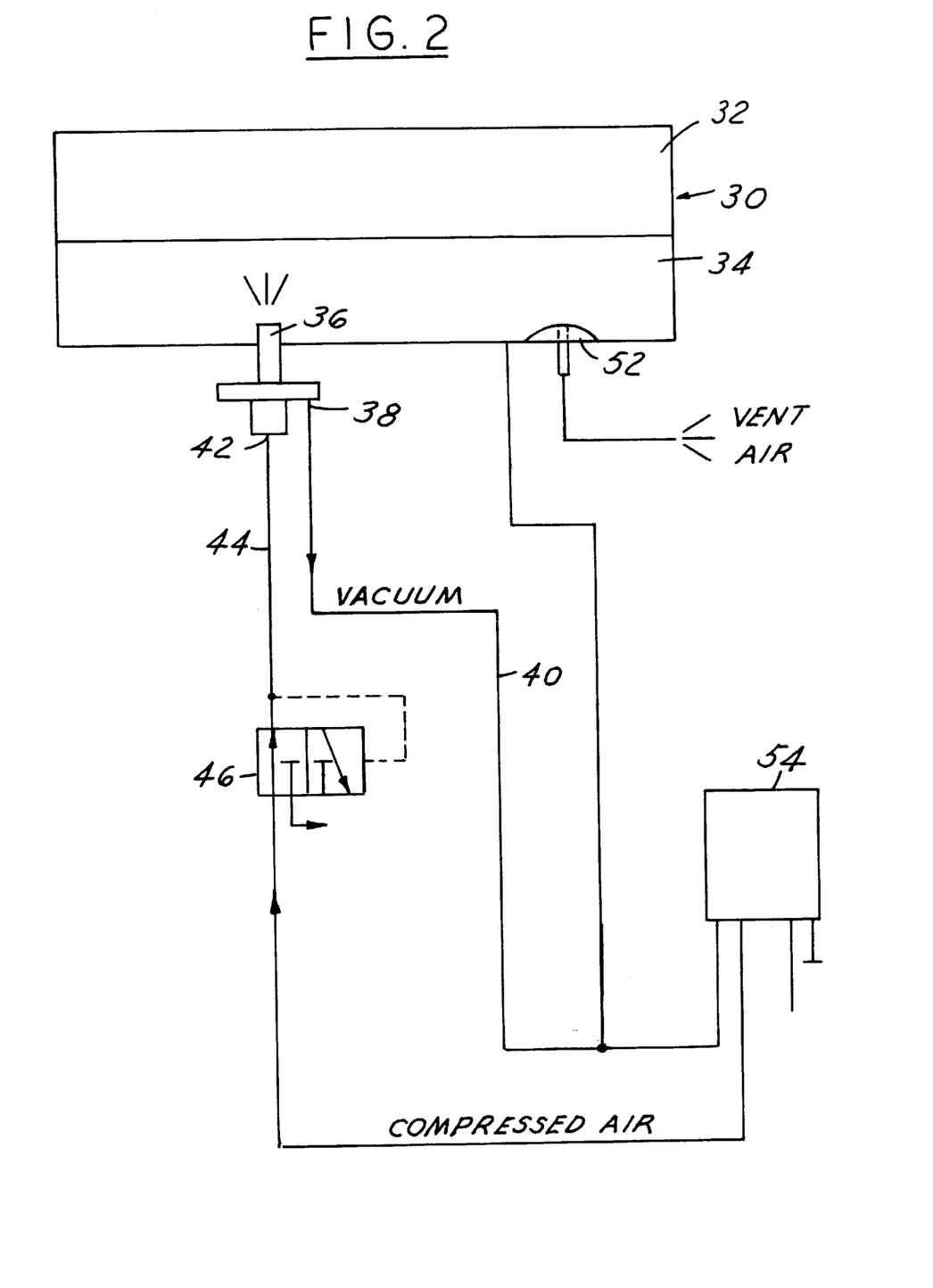
FIG. 2 is a schematic of another embodiment of the invention.

In the schematic shown in FIG. 2, vacuum and compressed air are supplied through a manifold 54. In all other respects the method is the same as that shown in FIG. 1.

Figure 3:
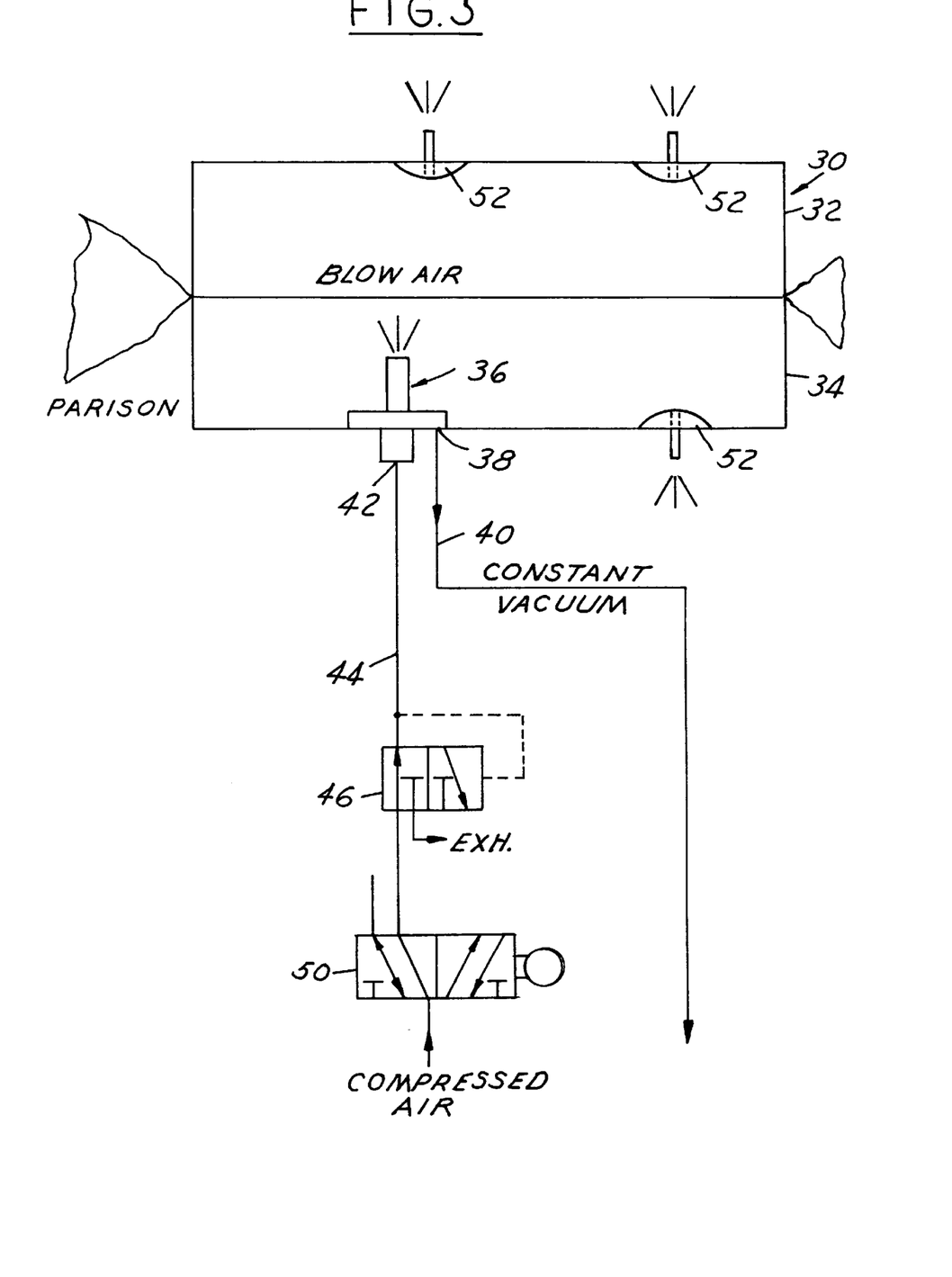
FIG. 3 is a schematic of still another embodiment of the invention.

In the schematic shown in FIG. 3, plural micro vents are provided on mold halves 32, 34 as contrasted to FIG. 1.

Figure 4:
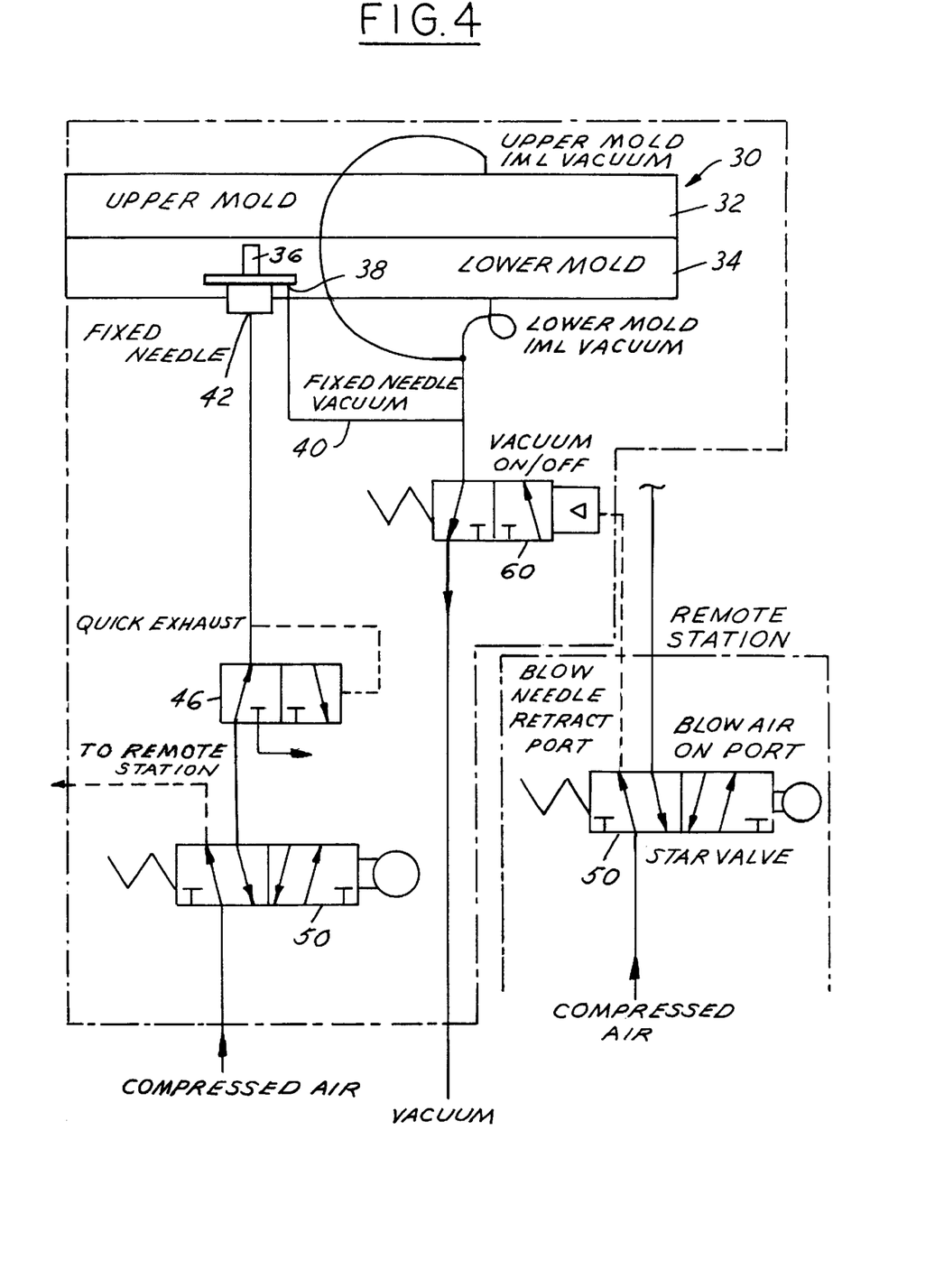
FIG. 4 is a schematic of another embodiment of the invention.
Figure 5:
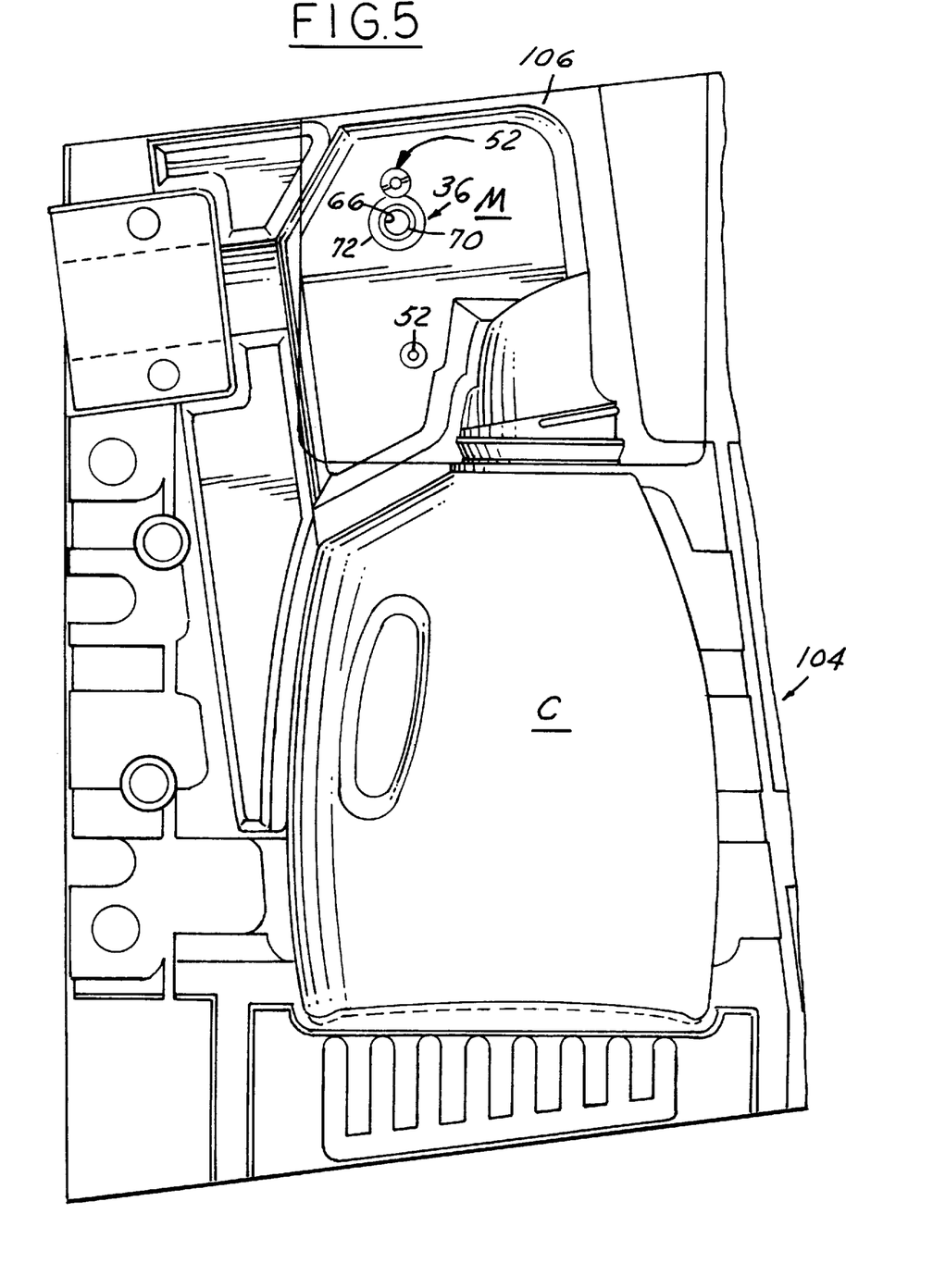
FIG. 5 is a top plan view of the lower mold half of a mold embodying the invention.
Figure 6:
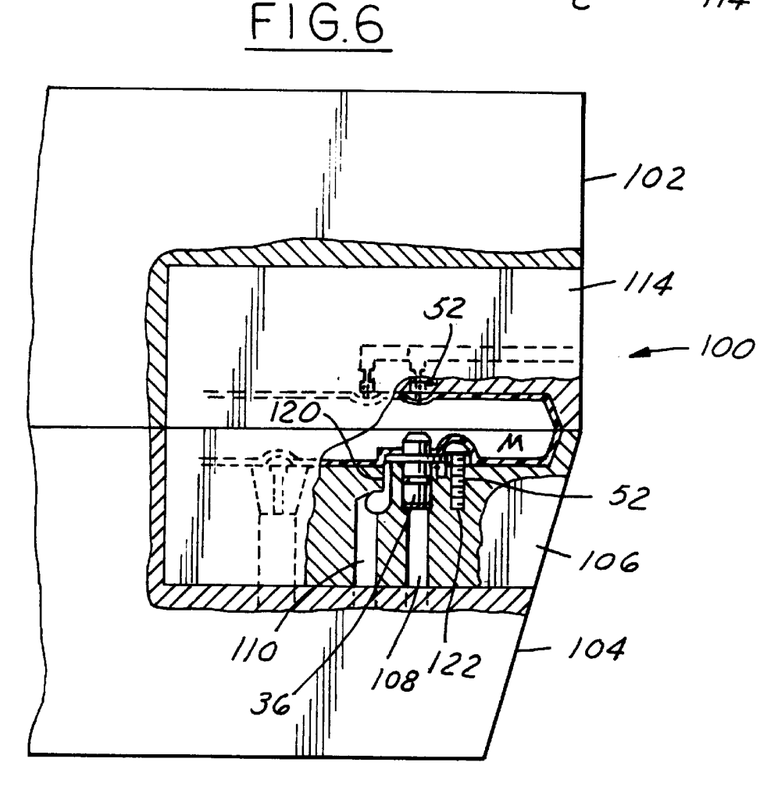
FIG. 6 is a fragmentary part sectional view of a portion of the mold shown in FIG. 5.
Figure 7:
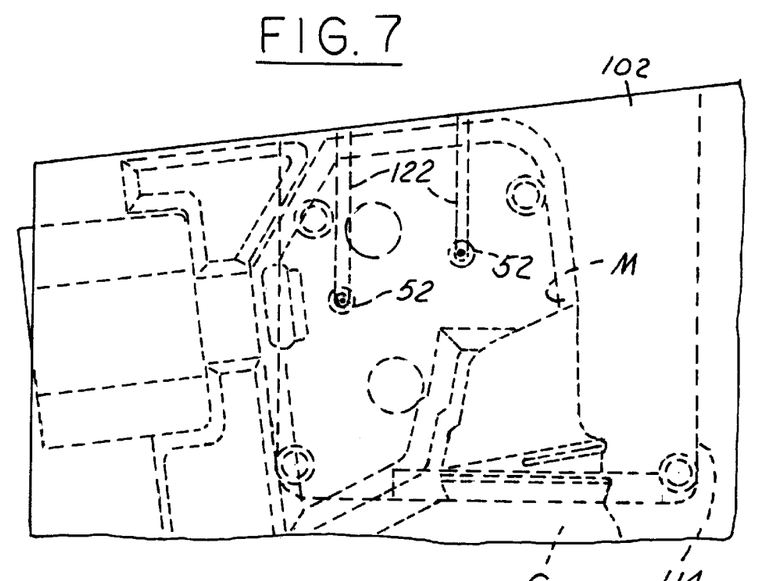
FIG. 7 is a fragmentary top plan view of the mold.
Figure 8:
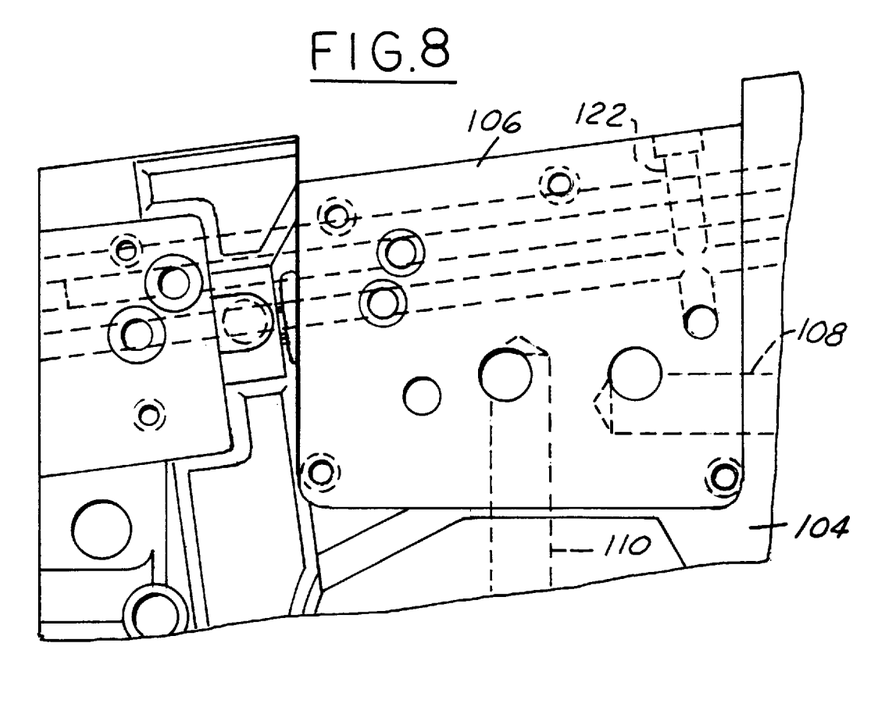
FIG. 8 is a fragmentary top plan view of the lower mold half.
Figure 9:
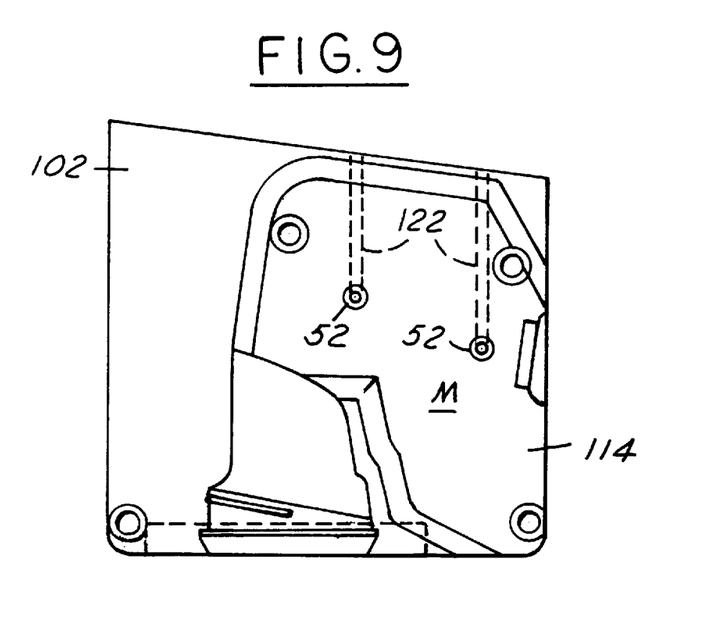
FIG. 9 is a bottom view of the top mold insert.
Figure 10:
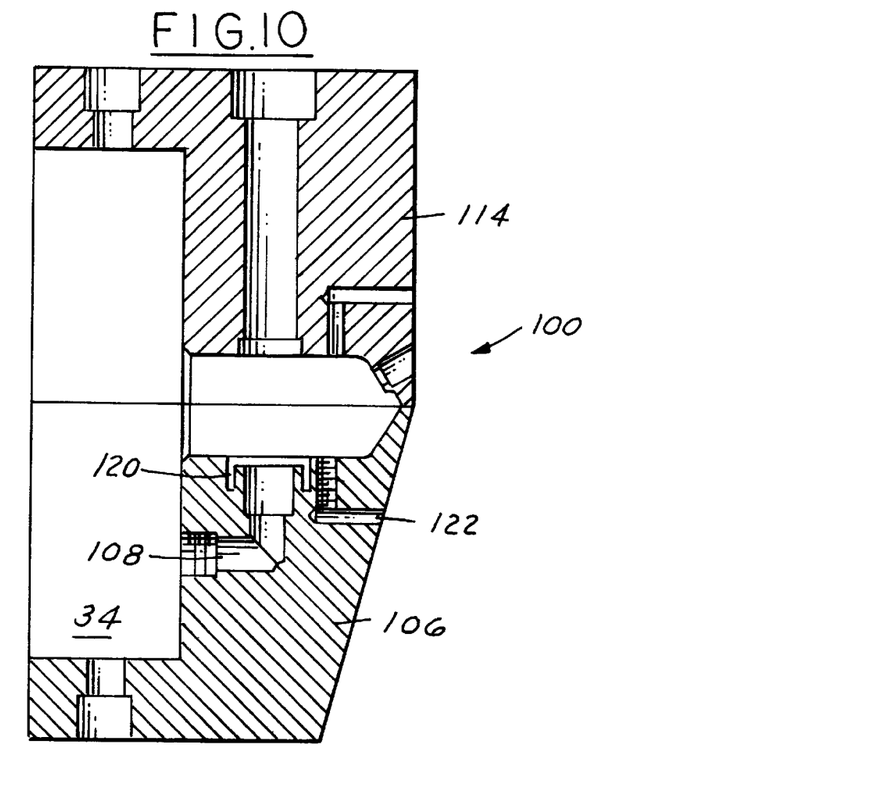
FIG. 10 is a fragmentary sectional view on an enlarged scale of a portion of the mold shown in FIG. 6.
Figure 11:
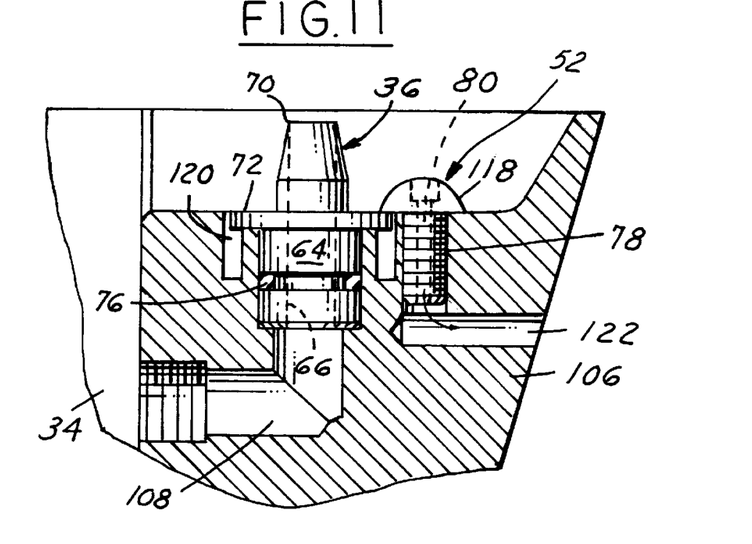
FIG. 11 is a fragmentary sectional view on an enlarged scale of a portion of the mold shown in FIG. 10.

In the modified schematic shown in FIG. 4, the circuit is shown as a part of a wheel type blow molding machine such as that in the aforementioned patents, wherein the blow air valve 50 and vacuum valve 60 of each pair of mold halves are controlled by cams as the wheel rotates as disclosed in said patents, incorporated herein by reference.

Figure 24:
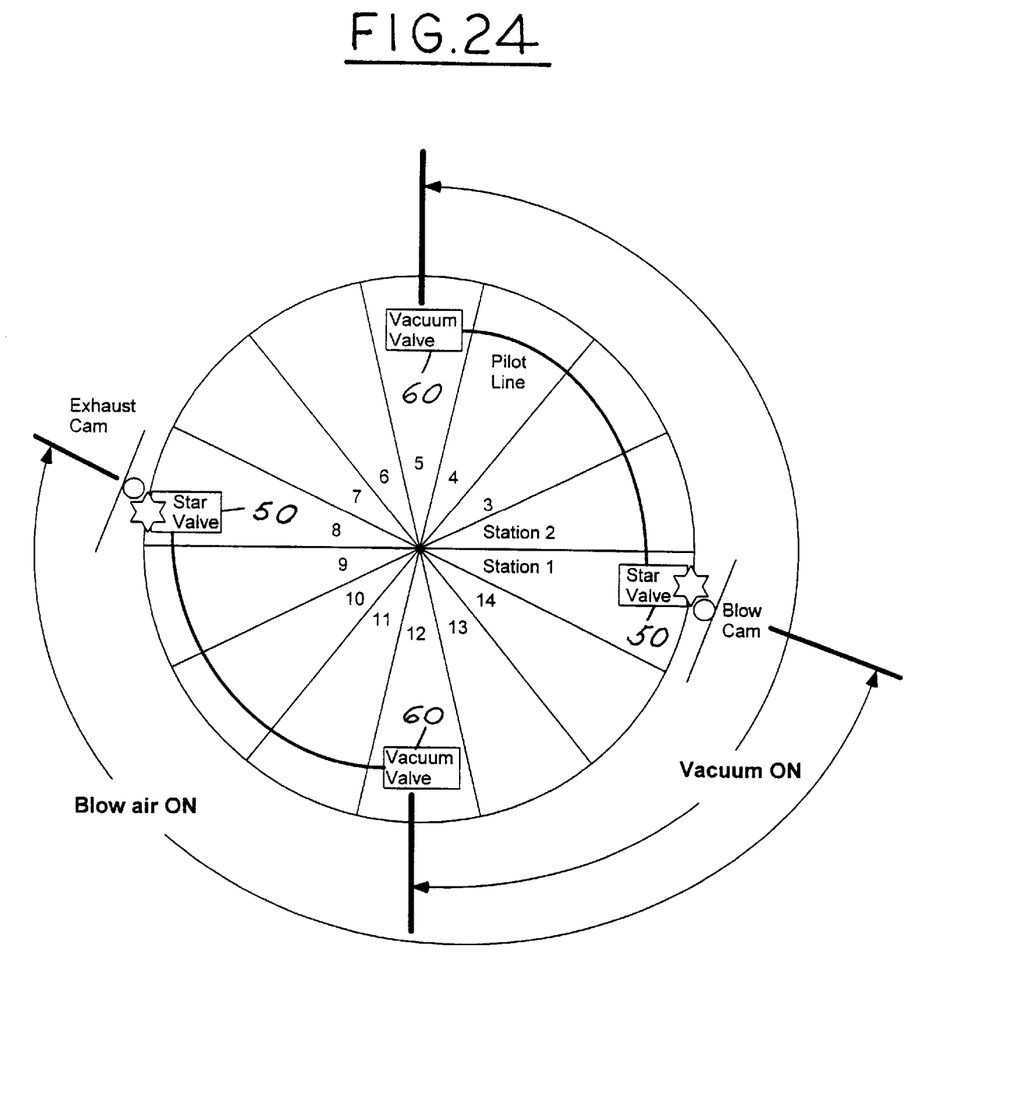
FIG. 24 is a schematic diagram of vacuum and blow air as used in a rotary blow molding machine.

In operation as shown in FIG. 24, the molds are provided about the periphery of a wheel in circumferentially spaced relation such that they move in a closed path in the manner of the aforementioned patents. A first cam is positioned at one station for actuating the air control star valve of each mold as it passes and a second exhaust cam is positioned at a circumferentially spaced station for controlling the exhaust valve of each mold when it reaches and passes that station. The star valve 50 associated with each mold 30 controls the vacuum valve of a subsequent mold to supply vacuum before blow air is supplied and during the first portion of the cycle when blow air is on.

The operation is summarized as follows:

The system is designed that when the BLOW AIR is OFF at the Operator Control Panel, vacuum will be ON to all stations, IML vents and fixed needles.

When the BLOW AIR is ON at the Operator Control Panel, vacuum will be ON only to half of the stations, IML vents and fixed needles.

With the BLOW AIR On, the stations with vacuum ON will be the stations from 12 O'clock to 6 O'clock, clockwise. The vacuum to the mold IML vents and the fixed needle comes ON just before the IML assembly and shuts OFF at the bottom of the wheel.

The chart below shows which station controls the vacuum in another station. It must be noted that the offset is 4 stations.

| Station | Vacuum Valve Location Station | Mold and Fixed Needle Vacuum ON/OFF Controlled by Star Valve Located in Station |
| --- | --- | --- |
| 1 | 1 | 11 |
| 2 | 2 | 12 |
| 3 | 3 | 13 |
| 4 | 4 | 14 |
| 5 | 5 | 1 |
| 6 | 6 | 2 |
| 7 | 7 | 3 |
| 8 | 8 | 4 |
| 9 | 9 | 5 |
| 10 | 10 | 6 |
| 11 | 11 | 7 |
| 12 | 12 | 8 |
| 13 | 13 | 9 |
| 14 | 14 | 10 |

Order of Operation:
1. Station #1 engages the Blow Cam. Station #1 blow air comes ON and Station #5 vacuum comes ON.
2. Station #1 engages the Exhaust Cam. Station #1 blow air shuts OFF and Station #5 vacuum shuts OFF.

This operation is repeated for each mold in sequence as the wheel turns.

Figure 25:
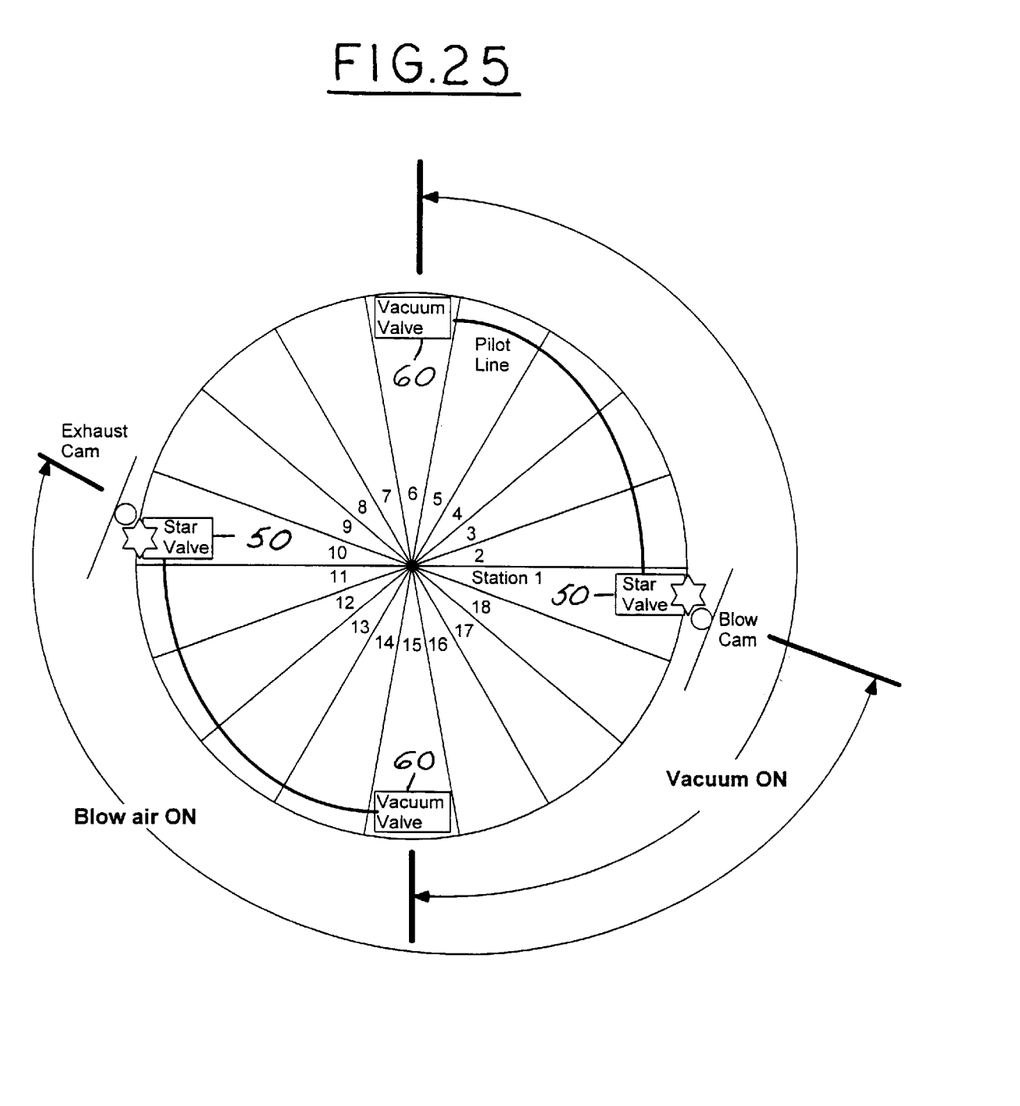
FIG. 25 is a schematic view similar to FIG. 24 of a system used in a rotary blow molding machine having more molds than that shown in FIG. 24.

In the schematics shown in FIG. 25, 18 sets of molds are provided and the placement of the blow valve, exhaust valve and vacuum valve are preferably positioned as indicated.

Figure 12:
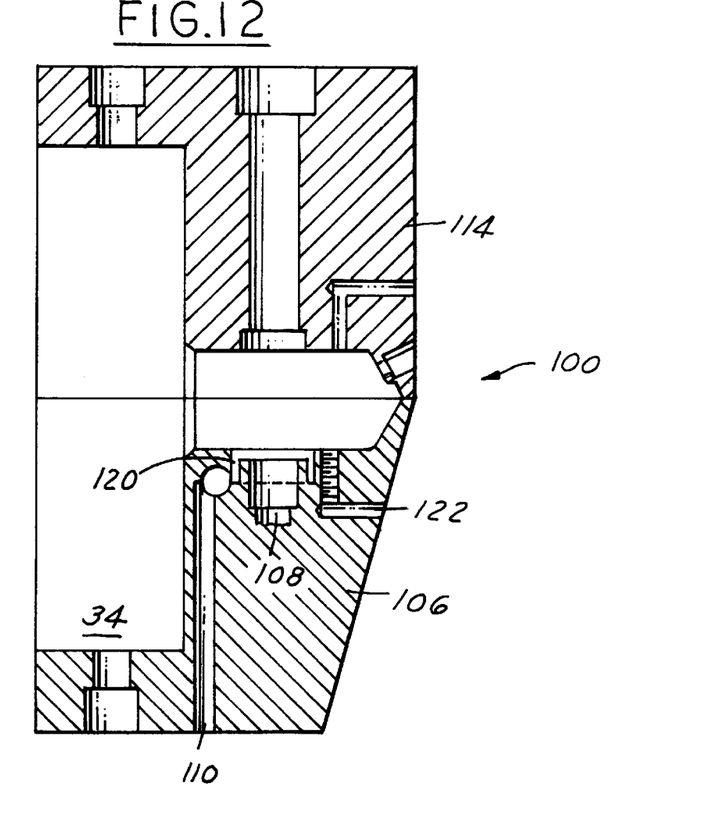
FIG. 12 is a fragmentary sectional view similar to FIG. 10 sharing the passage for providing a vacuum.
Figure 13:
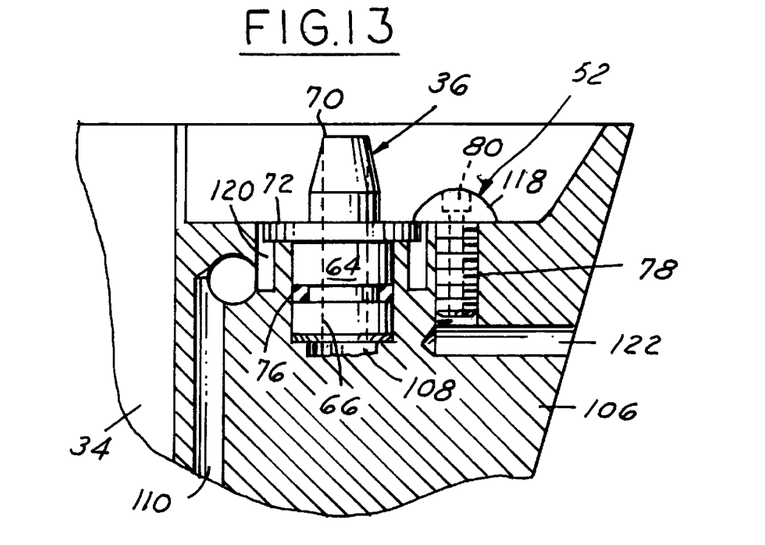
FIG. 13 is a fragmentary sectional view similar to FIG. 12 showing a fixed needle in position.
Figure 14:
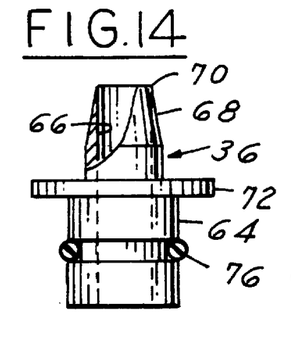
FIG. 14 is a part sectional elevated view of a fixed needle embodying the invention.
Figure 15:
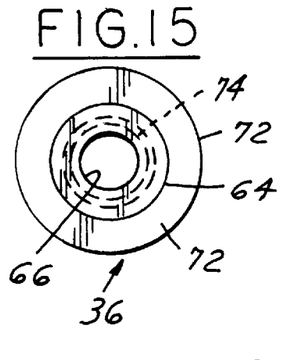
FIG. 15 is a bottom plan view of the fixed needle.
Figure 16:
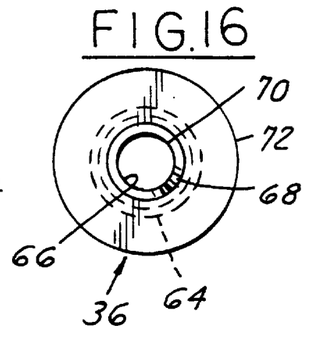
FIG. 16 is a top plan view of the fixed needle.
Figure 17:
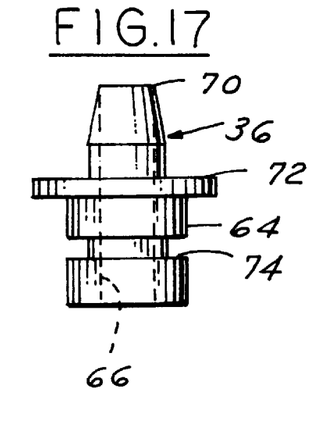
FIG. 17 is an elevational view of the fixed needle shown in FIGS. 14–16 with the O-ring removed.
Figure 18:
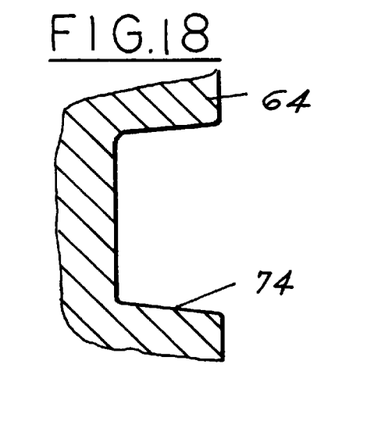
FIG. 18 is a fragmentary sectional view of the O-ring groove of the fixed needle.
Figure 19:
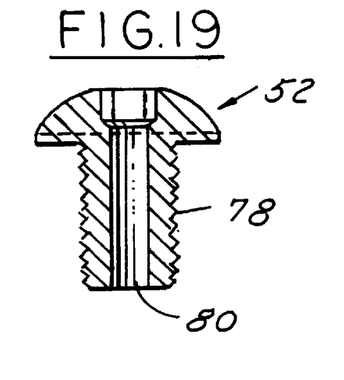
FIG. 19 is a sectional view taken along the lines 19—19 in FIG. 20.
Figure 20:
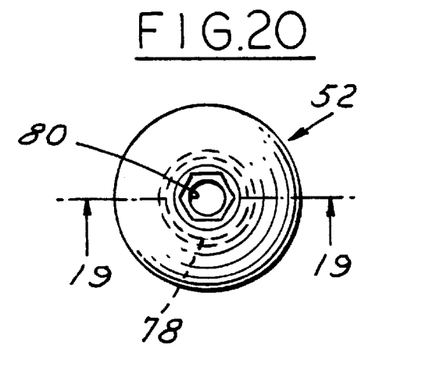
FIG. 20 is a plan view of a micro vent used in the invention.

Referring to FIGS. 14–18, a preferred needle 36 comprises a one-piece body 64 having a bore 66 defining the second or compressed air passage 42 (FIGS. 1–4). An annular passage 120 in the mold half (FIGS. 10–13) concentric with bore 66 and surrounding body 64 defines the vacuum passage. The nose 68 of the needle 36 is preferably shaped as truncated cone tapering to a sharp edge 70. Fixed needle 36 includes an annular flange 72. Body 64 of the needle is formed with an annular groove 74 that receives an O-ring 76. Vacuum line 38 extends through a passage 110 (FIGS. 12–13) in mold half 106 to the area above O-ring 76, as presently described, such that vacuum is drawn through passage 120 about the annular flange 72. As shown in FIGS. 19 and 20, the micro vents 52 each comprise a threaded headed screw 78 with a central passage 80 that has a diameter on the order of $1/16$ inch to provide for venting of the area surrounding the molten plastic parison.

Figure 21:
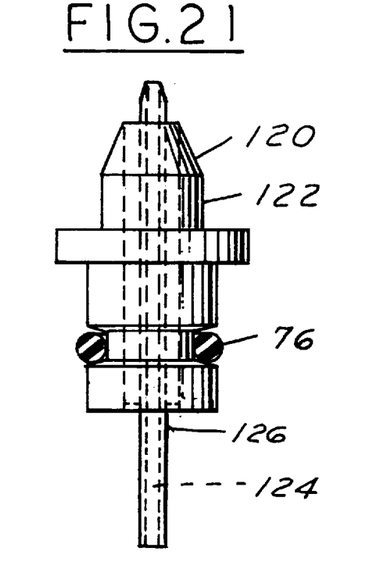
FIG. 21 is an elevational view of a double fixed needle.
Figure 22:
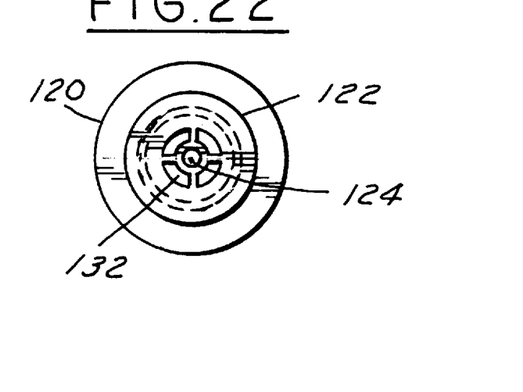
FIG. 22 is a bottom plan view of the double fixed needle shown in FIG. 21.
Figure 23:
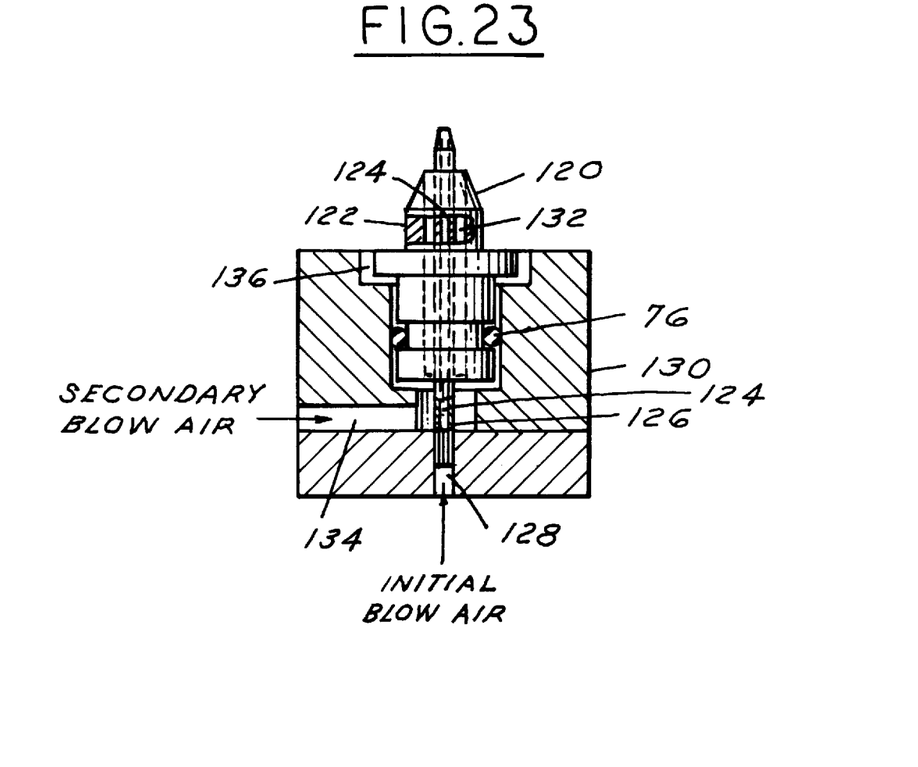
FIG. 23 is a sectional view of the double fixed needle in a mold.

Referring to FIGS. 21–23, a modified form of needle comprises a double fixed needle comprising a body 122 having an axial passage 124 defined by a tube 126 and engaging an axial air inlet 128 in mold 130. and an annular passage 132 about the tube 126 to which blow air is supplied by a radial inlet 134 in the mold 130. Vacuum is provided about the body 122 by an annular passage 136. Such a double fixed needle has utility in hard to blow bottles and bottles requiring more exhaust area or passage.

Referring to FIGS. 5–11, the invention is described with respect to molds utilized on a wheel machine made in accordance with the aforementioned U.S. Pat. Nos. 4,523, 904; 4,549,865; and 4,648,831 for making a hollow container forming portion C with an integral hollow moil M which communicates with the container C. The needle 36 and micro vents 52 are associated with the moil forming portion of the mold. Each mold 100 comprises an upper mold half 102 and a lower mold half 104. Lower mold half 104 has a removable insert 106 in which a fixed needle 36 and a microvent 52 are positioned. The insert 106 includes a passage 108 which communicates with the bore 66 (FIGS. 14–17) of the needle 36 to provide compressed air and a passage 110 which communicates with the annular passage 120 (FIGS. 6 and 10–13) surrounding the needle 36 to apply vacuum. The upper half 102 includes a removable insert 114 which has one or more exhaust micro vents 52 to the exterior through passages 122.

Among the advantages of the invention are:
1. The method and apparatus are simple and less complex.
2. There are no moving parts in the blow needle.
3. The cost of the blow needle is substantially less than a movable needle.
4. Mold costs are reduced because of the simplicity of placement, design and manufacturing.
5. The blow needle is more reliable.
6. Downtime for blowing failure is significantly reduced.
7. The operating window for blowing is wider which makes process start up easier.

It can thus be seen that there has been provided a method and apparatus wherein does to require a movable needle; which has no moving parts; which is simpler to construct and maintain; which is less costly; which reduces mold costs by utilizing simplicity of placement, design and manufacture; which has less downtime; which is more reliable;

which is more readily maintained; and which facilitates process start up.

What is claimed is:

1. A method of blow molding hollow plastic containers comprising the steps of:
   providing a blow mold comprising mold portions which when closed define a mold cavity,
   providing a fixed blow needle in at least one mold portion, said blow needle having an opening,
   positioning a molten hollow plastic parison between said mold portions,
   closing said mold portions about said plastic parison,
   providing fixed means in said one mold portion surrounding said fixed blow needle for pulling the molten plastic parison about the fixed blow needle,
   applying vacuum to the mold cavity through said fixed means to pull the molten plastic parison about the fixed blow needle, and
   thereafter providing air through the opening in said fixed needle to tear the plastic and to expand the parison to the confines of the mold cavity.

2. The method set forth in claim 1 wherein said step of providing said fixed means comprises the step of providing a fixed aperture in said one mold portion around the periphery of the fixed blow needle, and wherein said step of applying vacuum comprises applying said vacuum to the mold cavity through said aperture about the periphery of said fixed blow needle.

3. The method set forth in claim 2 including providing at least one vent in said cavity to facilitate venting in the space about said parison.

4. The method set forth in claim 2 wherein said step of providing said mold further comprises providing a moil cavity portion and a body cavity portion communicating with said moil cavity portion, and wherein said step of providing said fixed blow needle comprises positioning said needle in said moil cavity portion.

5. The method set forth in claim 4 including providing a second fixed blow needle in said moil cavity portion and a second fixed aperture around the periphery of said second fixed needle, wherein said step of applying vacuum comprises applying vacuum to both of said fixed apertures to draw the plastic parison about said needles at said moil portion, and wherein the step of providing air comprises introducing air through said first and second needles to tear the plastic and expand the parison to the confines of the mold cavity.

6. The method set forth in claim 1 wherein said step of providing air further comprises the step of employing a valve to control the flow of air to said fixed needle.

7. The method set forth in claim 6, wherein said steps of providing air includes providing an exhaust valve to exhaust air from said cavity.

8. The method set forth in claim 6 wherein said step of employing said valve comprises the step of employing a combined valve for controlling the flow of air and the application of vacuum.

9. The method set forth in claim 8 wherein said steps of supplying air includes providing an exhaust valve to exhaust air from said cavity.

10. The method set forth in claim 6 wherein said step of providing said fixed means comprises the step of providing a fixed aperture around the periphery of the blow needle and wherein said step of applying vacuum comprises applying said vacuum through said aperture about the periphery of said fixed blow needle.

11. The method set forth in claim 10 including providing at least one vent in said cavity to facilitate venting in the space about said parison.

12. The method set forth in claim 11 wherein said step of providing said mold further comprises providing a moil cavity portion a body cavity portion communicating with said moil cavity portion, and wherein said step of providing said fixed blow needle comprises positioning said needle in said moil cavity portion.

13. The method set forth in claim 12 including providing a second fixed blow needle in said moil cavity portion and a second fixed aperture around the periphery of said second fixed needle, wherein said step of applying vacuum comprises applying vacuum to both of said fixed means to draw the plastic parison about said needles at said moil portion, and wherein the step of providing air comprises introducing air through said first and second needles to tear the plastic and expand the parison to the confines of the mold cavity.

14. The method set forth in claim 1 wherein said step of providing a fixed needle comprises providing a fixed needle having dual air passages for providing air.

15. The method set forth in claim 14 wherein said step of providing said fixed means comprises the step of providing a fixed aperture around the periphery of the fixed blow needle, and wherein said step of applying a vacuum comprises providing said vacuum through said fixed means about the periphery of the fixed needle.

16. The method set forth in claim 15 wherein said step of providing said dual air passage comprises providing concentric air passages in said needle.

17. The method set forth in any one of claims 1–5, 6–13, or 14–16 wherein said step of providing a blow mold further comprises providing a plurality of molds, each of which includes a fixed means and a fixed blow needle to which vacuum and air are supplied.

18. The method set forth in claim 17 including the further step of controlling the application of vacuum and air during the steps of applying vacuum and providing air.

19. The method set forth in claim 18 wherein said step of controlling the application vacuum and air comprises positioning said molds and their associated fixed means and fixed needles in a closed path, providing a first cam at a first position about the closed path, providing a second cam at another position about said path, providing an air control valve on each mold such that the first cam actuates said air control valve at said first position to apply air to the associated mold and said second cam actuates said air control valve at said second position to end application of air to the associated mold.

20. A method of blow molding hollow plastic containers that comprises the steps of:
   (a) providing a blow mold having mold portions that, when closed, define a mold cavity,
   (b) providing a fixed blow needle in at least one of the mold portions,
   (c) providing a fixed aperture that opens into the mold cavity adjacent to said fixed needle for applying vacuum to the mold cavity,
   (d) coupling said fixed blow needle and said fixed aperture to control valve means for selectively applying air to said needle and vacuum to said aperture,
   (e) positioning a molten hollow plastic parison between the mold portions,
   (f) closing the mold portions about the plastic parison, and
   (g) controlling operation of the valve means first to apply vacuum to the mold cavity through the aperture for pulling the molten plastic about the fixed blow needle, and then to apply air to the blow needle to blow the parison to the confines of the mold cavity.

21. The method set forth in claim 20 wherein said step (a) comprises the step of providing a plurality of said blow molds movable about a closed path; wherein said steps (b) and (c) comprise the step of providing a fixed blow needle and a fixed aperture adjacent to the blow needle in each of said molds; wherein said step (d) further comprises the steps of: (d1) providing a plurality of control valves each associated with one of said molds, (d2) coupling the fixed blow needle of each said mold to the associated valve, and (d3) coupling the fixed aperture of each said mold to another control valve; and wherein said step (g) further comprises the step of actuating each of said control valves in turn as said molds and valves move through said closed path so that vacuum is applied to each said mold in turn before air is applied to each said mold.

\* \* \* \* \*